3,472,847
CONVERSION OF PYRAZINOYLCYANAMIDES TO PYRAZINOYLGUANIDINES

Peter I. Pollak, Scotch Plains, and Roger J. Tull, Metuchen, N.J., assignors to Merck & Co., Inc., Rahway, N.J., a corporation of New Jersey
No Drawing. Filed Aug. 25, 1966, Ser. No. 574,905
Int. Cl. C07d 51/76; A61k 27/00
U.S. Cl. 260—250                9 Claims

ABSTRACT OF THE DISCLOSURE

A process is described for the preparation of pyrazinoylguanidines which have utility as diuretic and natriuretic agents, which comprises the treatment of novel pyrazinoylcyanamides with ammonia or amines.

---

This invention is concerned with a novel process for the preparation of (3,5-diamino-6-halopyrazinoyl)guanidine compounds which possess useful diuretic properties but more importantly they selectively enhance the excretion of sodium and chloride ions while suppressing the excretion of potassium. The products prepared by the novel process of this invention are especially useful in the treatment or management of edema and other abnormalities resulting from the retention of excess quantities of sodium and/or fluid by the animal organism.

The novel process of this invention involves the reaction of a 3,5-diamino-6-halopyrazinoylcyanamide or a 3-acyl derivative thereof with ammonia or an amine which gives the desired (3,5 - diamino-6-halopyrazinoyl)guanidine products. This novel process represents a simple and highly economical method by which an important group of diuretics and/or natriuretic products can be produced.

The reaction advantageously is carried out in a reaction medium maintained at a pH of at least 7 but advantageously at about 7.5 to 8.5 and in the presence of a solvent such as a lower alkanol such as methanol, ethanol, propanol, butanol, tertiary butanol and the like or in the presence of dimethylformamide or dimethyl sulfoxide or other inert solvents. While the reaction will proceed at ambient temperature, moderate heating up to the reflex temperature of the reaction mixture can be employed if desired. The desired end product generally separates as a solid from the reaction mixture and can be collected and purified by any conventional method. Ammonia in any form can be used, such as aqueous or gaseous and excess ammonia or the selected amine can be used to maintain the reaction mixture at a suitable pH. When ammonium hydroxide is employed, the concentration of ammonium ions can be increased by the addition of ammonium chloride. Usually about 3 moles of ammonium chloride is adequate, though this amount may need to be adjusted upward or downward to meet the requirements of the particular reaction conditions.

While the novel method of this invention can utilize substantially any 3,5-diamino-6-halopyrazinoylcyanamide or 3-acyl derivative thereof to prepare the corresponding pyrazinoylguanidine product, it is particularly useful in the conversion of a 3-amino(or acylamino)-5-amino(or substituted amino)-6-halopyrazinoylcyanamide with ammonia or an amine to form the corresponding pyrazinoylguanidine product, which reaction is illustrated by the following reaction scheme:

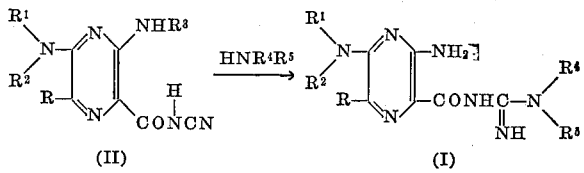

wherein R is halogen, particularly chloro or bromo; $R^1$ and $R^2$ can be the same or dissimilar groups selected from hydrogen, lower alkyl advantageously having from one to five carbon atoms as methyl, ethyl, propyl, isopropyl, butyl, amyl or any other branched 4 or 5 carbon alkyl groups, lower alkenyl advantageously having from 3 to 5 carbon atoms and particularly the allyl, propargyl or 3-pentenyl and the like, or a lower-(cycloalkylalkyl) group advantageous having from 4 to 8 carbon atoms such as the cyclopropylmethyl, cyclopentylmethyl, cyclohexylmethyl, cyclohexylethyl, cyclopropylethyl and the like; $R^3$ represented hydrogen or an acyl radical of the structure XCO— wherein X is hydrogen or a lower alkyl group having advantageously from 1 to 5 carbon atoms, $R^4$ represents hydrogen, a lower alkyl advantageously having from 1 to 5 carbon atoms, such as methyl, ethyl, propyl, isopropyl, butyl, amyl, or any of the branched 4 or 5 carbon alkyl groups, or substituted lower alkyl groups having from 1 to 5 carbon atoms and particularly those containing hydroxy or a heterocyclic substituent such as the pyridyl substituent or a phenyl substituent, the phenyl-lower alkyl advantageously having an alkyl moiety of 1 to 2 carbon atoms and the phenyl moiety being either unsubstituted or substituted with 1 or more halogen (preferably chlorine, bromine, fluoride), lower alkyl (having 1 to 2 carbon atoms) and lower alkoxy (having 1 to 2 carbon atoms) groups; $R^5$ advantageously is hydrogen, lower alkyl having 1 to 5 carbon atoms such as metyl, ethyl, propyl, isopropyl, butyl, amyl or any of the branched 4 or 5 carbon alkyl groups, phenyl-lower alkyl wherein the alkyl moiety advantageously has from 1 to 2 carbon atoms and the phenyl moiety being either substituted or having one or more substituents selected preferably from halogen (advantageously chlorine, bromine, fluorine), lower alkyl (advantageously having from 1 to 2 carbon atoms) and lower alkoxy (having 1 to 2 carbon atoms) groups; when $R^4$ and $R^5$ are each lower alkyl, they can be linked together to form a cyclic structure with the nitrogen atom to which they are attached, thereby forming a group having the structure

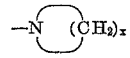

wherein $x$ preferably is one of the numerals from 4 through 7 thus yielding, for example, the 1-pyrrolidinyl group.

The 3,5-diamino-6-halopyrazinoylcyanamides II used as the starting material in the novel process of this invention can be made by one of several methods.

One suitable method involves the treatment of alkyl 3,5-diamino-6-halopyrazinoate with an alkali metal hydrogen cyanamide.

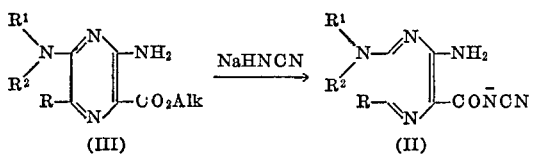

This reaction can be carried out in the presence of a solvent such as a lower alkanol of the type hereinbefore defined or dimethylformamide or dimethyl sulfoxide and the like and at ambient to reflux temperatures. It will be understood that the pyrazinoylcyanamide product thus obtained need not be separated and purified but can be treated, in situ, with ammonia or an amine to form the desired pyrazinoylguanidine products.

Another method for making the pyrazinoylcyanamide starting materials used in the novel process of this invention can be illustrated as follows:

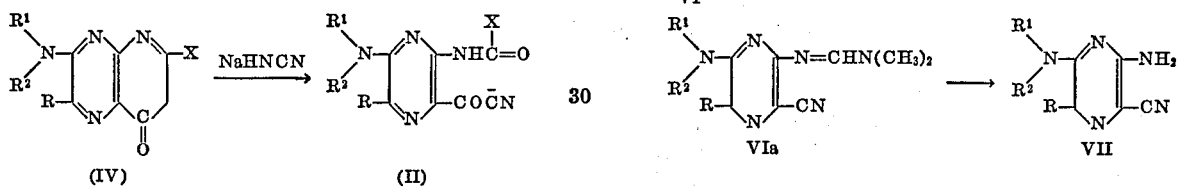

This process involves the reaction of a 6-halo-7-amino-4H-pyrazino[2,3-d][1,3]oxazin-4-one with an alkali metal hydrogen cyanamide which gives the 3-acylamino-5-amino-6-halopyrazinoylcyanamide product. This product need not be separated from the reaction mixture but can be converted in situ by treatment with ammonia to form the desired pyrazinoylguanidine products. The reaction of the pyrazino-oxazinone with the alkali metal salt of cyanamide advantageously is carried out in the presence of a solvent such as a lower alkanol of the type hereinbefore defined or dimethylformamide or dimethyl sulfoxide and the like inert solvent and either at ambient temperature or at moderately elevated temperatures up to the reflux temperature of the reaction mixture.

Another suitable method that can be employed in the synthesis of the 3,5-diamino-6-halopyrazinoylcyanamides can be illustrated as follows:

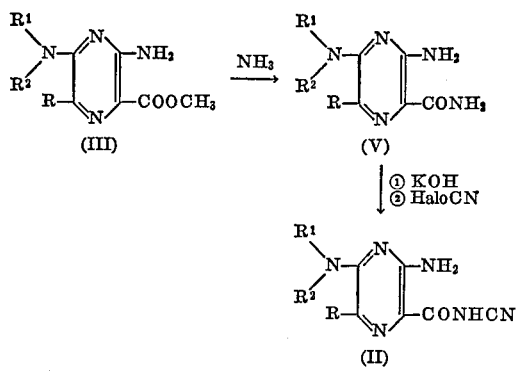

The 3,5-diamino-6-halopyrazinamide (V) intermediates advantageously are prepared by the reaction of the appropriate alkyl 3,5-diamino-6-halopyrazinoate (III) with ammonia. Reaction can be conducted using liquid ammonia at temperatures slightly below or slightly above ambient temperature or, the ester III can be dissolved in an inert solvent and ammonia gas admitted below the surface of the solution. The potassium salt of the amide is then prepared by treating it with potassium hydroxide preferably in isopropanol although other lower alkanols such as n-propanol and butanol and the like can be used. The precipitated potassium amidate is then treated with a cyanogen halide, preferably cyanogen bromide and then usually heated on the steam bath to accelerate the reaction, although it will proceed at room temperature. The pyrazinoylcyanamide (II) can then be isolated by filtering and evaporating the solvent, but normally the mixture is treated directly with ammonia or an amine as described above to produce the pyrazinoylguanidine.

Still another method that can be used to make the pyrazinoylcyanamides (II) is illustrated as follows:

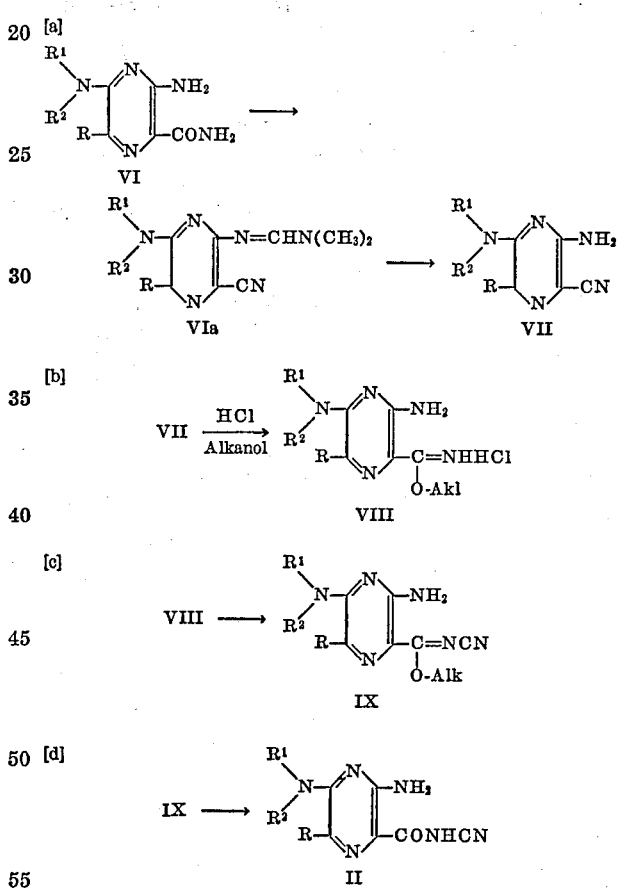

[a] The 3,5-diamino-6-halopyrazinamide (VI) upon treatment with either phosphoryl chloride or thionyl chloride in the presence of dimethylformamide, advantageously with warming forms the corresponding N,N-dimethyl-N' - (3 - cyano - 5 - halo - 6 - amino - 2 - pyrazinyl)formamidines (VIa) which can be hydrolyzed in the presence of a strong mineral or organic acid (such as hydrochloric, sulfuric, methanesulfonic and the like acids) to produce the 3,5-diamino-6-halopyrazinonitrile (VII).

It is to be recognized that if $R^1$ and $R^2$ in the starting amide VI are each hydrogen, in the intermediate (VIa), the 5-position amino group will be $N=CHN(CH_3)_2$, but in the product VII the 5-position group will be reconstituted to the free amino group since hydrolysis will involve both the 3- and the 5-substituents.

[b] The pyrazinonitrile, VII, upon reaction with a lower alkanol, advantageously one having from 1 to 3 carbon atoms, under anhydrous conditions and in the presence of hydrogen chloride or hydrogen bromide gas, is converted to the alkyl 3,5-diamino-6-halopyrazinimidate (VIII). The pyrazinimidate generally crystallizes from the reaction mixture and can be separated therefrom by known methods. The reaction preferably is carried out in the presence of a solvent advantageously absolute ether, normal dibutyl ether, or other anhydrous ethers or dioxane, dimethylformamide, dimethyl sulfoxide and the like, and preferably at reduced temperatures such as at 0° C. although temperatures up to about 60° C. could be employed. The reaction is continued for from 6 hours to several days or until a sufficient yield of crystalline material is obtained. If desired the pyrazinimidate can be employed in the next step [c] directly or it can be dried in a desiccator over any dehydrating agent capable of absorbing hydrogen chloride and hydrogen bromide gas and then used in the following reaction:

[c] and [d] Treatment of intermediate VIII with an anhydrous alcoholic solution of cyanamide or preferably cyanogenhalide as the chloride or bromide, while slowly adding a base such as an alkali metal lower alkoxide advantageously sodium or potassium methoxide or ethoxide gives alkyl N - cyano - 3,5 - diamino-6-halopyrazinimidate (IX). The reaction preferably is carried out in ethanol with heating, preferably to reflux, followed by evaporation of the solvent which results in a residue which is product IX. Hydrolysis of intermediate IX with dilute mineral acid provides a solution of 3,5-diamino-6-chloropyrazinoylcyanamide (II) which may be isolated or more conveniently used directly in the novel process of this invention.

The following examples illustrate the novel process of this invention.

EXAMPLE 1

(3,5-diamino-6-chloropyrazinoyl)guanidine

One mole of methyl 6-chloro-3,5-diaminopyrazinoate in one liter of ethanol is treated with one mole of sodium hydrogen cyanamide and the reaction mixture is refluxed for three hours. The solvent then is removed by evaporation and the residue is dissolved in one liter of concentrated aqueous ammonium hydroxide containing three moles of ammonium chloride. This solution is heated on a steam bath for three hours keeping the pH greater than 8 with ammonium hydroxide. The mixture then is cooled and the precipitated product is collected by filtration and dried to give (3,5-diamino-6-chloropyrazinoyl)guanidine, M.P. 240.5–241.5° C. (dec.). The product can be converted to its hydrochloride salt by dissolving the product in alcohol and precipitating by the addition of hydrochloric acid. The product in the form of its hydrochloride salt melts at 293.5° C. (dec.).

EXAMPLE 2

3,5-diamino-6-chloropyrazinoylguanidine

Step A: Preparation of 3,5-diamino-6-chloropyrazinamide.—Methyl 3,5 - diamino - 6 - chloropyrazinoate (0.1 mole) is added to liquid ammonia (200 ml.) in a stainless steel autoclave and the reaction mixture is heated at 100° C. for 12 hours. The ammonia is expelled and the product is removed from the autoclave and recrystallized from methanol to give a 90% yield of 3,5-diamino-6-chloropyrazinamide, M.P. 218.5–220.5° C.

Step B: Preparation of 3,5-diamino-6-chloropyrazinoylcyanimide.—3,5 - diamino - 6 - chloropyrazinamide (0.1 mole) is dissolved in 100 ml. of anhydrous isopropanol. With stirring, 0.1 mole of solid potassium hydroxide is added. After the potassium hydroxide dissolves, the precipitate of the potassium salt of the amide is collected under anhydrous conditions and suspended in 100 ml. of dry dimethylformamide. With stirring 0.1 mole of cyanogen bromide is added slowly and the mixture is heated on a steam bath for 2 hours. The resulting solution of 3,5-diamino-6-chloropyrazinoylcyanamide is used directly in the next step.

Step C: Preparation of 3,5-diamino-6-chloropyrazinoylguanidine.—To the solution from Step B is added 1 liter of concentrated ammonia solution containing 3 moles of ammonium chloride. This solution is heated on a steam bath for 3 hours, keeping the pH greater than 8 by periodic addition of ammonia solution. The mixture is cooled and the precipitated product is collected. After recrystallization from alcohol as described in Example 1 there is obtained (3,5 - diamino - 6 - chloropyrazinoyl)guanidine hydrochloride, M.P. 293.5° C. (dec.).

EXAMPLE 3

1-(3-amino-5-isopropylamino-6-chloropyrazinoyl)-3,3-dimethylguanidine

Step A: Preparation of 3 - amino-5-isopropylamino-6-chloropyrazinamide.—By replacing the methyl 3,5-diamino-6-chloropyrazinoate employed in Example 2, Step A, by an equimolar amount of methyl 3-amino-5-isopropylamino-6-chloropyrazinoate and following substantially the same procedure described in Example 2, Step A, there is obtained 3 - amino-5-isopropylamino - 6 - chloropyrazinamide, M.P. 140–141° C.

Step B: Preparation of N,N - dimethyl-N'-(3-cyano-5-chloro - 6-isopropylamino-2-pyrazinyl)formamidine.—To a stirred suspension of 3-amino-5-isopropylamino-6-chloropyrazinamide (7.2 g., 0.0315 mole) in dimethylformamide (70 ml.) is added in one portion phosphoryl chloride (7.0 ml.). The temperature rises to 65° C. and it is maintained at that temperature for 15 minutes by the application of heat. The reaction mixture then is poured into water (140 ml.) and the solution is neutralized with ammonium hydroxide, whereby the product separates yielding 4.5 g. (54%) of N,N-dimethyl-N'-(3-cyano-5-chloro - 6 - isopropylamino - 2 - pyrazinyl) - formamidine, M.P. 144–145° C. After crystallization from isopropyl alcohol, the melting point remains at 144–145° C.

Step C: Preparation of 3 - amino - 5 - isopropylamino-6-chloropyrazinonitrile.—A solution of N,N-dimethyl-N'-(3-cyano-5-chloro-6-isopropylamino - 2 - pyrazinyl)formamidine (2.6 g., 0.01 mole) in 2% hydrochloric acid (50 ml.) is heated on the steam bath for 30 minutes during which time the product begins to precipitate. The reaction mixture is chilled and the product recovered by filtration to yield 1.26 g. (60%) of 3-amino-5-isopropylamino-6-chloropyrazinonitrile, M.P. 124–127° C. After crystallization from methylcyclohexane, the product melts at 126–128° C.

Step D: Preparation of ethyl 3-amino-5-isopropylamino-6 - chloropyrazinimidate hydrochloride.—Hydrogen chloride gas (1.1 mole) is passed into a solution of 1 mole of 3 - amino - 5 - isopropylamino-6-chloropyrazinonitrile in 1.1 mole of absolute ethanol and 500 ml. of absolute ether at 0° C. The solution, protected from water, is stored at 0° C. for four days. The ethyl 3-amino-5-isopropylamino - 6 - chloropyrazinimidate hydrochloride that crystallized is collected and freed from excess hydrogen chloride in a vacuum desiccator over calcium oxide and potassium carbonate.

Step E: Preparation of 3 - amino-5-isopropylamino-6-chloropyrazinoylcyanamide.—Ethyl 3-amino - 5 - isopropylamino - 6 - chloropyrazinimidate hydrochloride (1.0 mole) is added with stirring to 1 liter of absolute ethanol containing 1 mole of cyanamide and the solution is refluxed 2 hours. Most of the solvent is then evaporated. The residue is treated with 1 liter of 2 N hydrochloric acid on a steam bath for 2 hours and cooled. The resulting 3-amino - 5 - dimethylamino-6-chloropyrazinoylcyanamide may be isolated or the solution of it can be used directly in the next step.

Step F: Preparation of 1-(3-amino-5-isopropylamino-6-chloropyrazinoyl)-3,3-dimethylguanidine.—The solution obtained in Step D is adjusted to pH 10 with dimethylamine and the mixture is heated on a steam bath for 3 hours during which time the pH is kept greater than 8 by periodic addition of dimethylamine. The resulting mixture is concentrated to about one-half volume and cooled.

The precipitated product is collected and recrystallized from alcohol to give 3-amino-5-isopropylamino-6-chloropyrazinoyl-3,3-dimethylguanidine, M.P. 238.5–240° C.

EXAMPLE 4

(3,5-diamino-6-chloropyrazinoyl)guanidine

One mole of 2-methyl-6-chloro-7-amino-4H-pyrazino[2,3-d][1,3]oxazine-4-one in one liter of ethanol is treated with one mole of sodium hydrogen cyanamide and the mixture then is refluxed for three hours. Thereafter the reaction mixture is evaporated and the residue dissolved in one liter of concentrated aqueous ammonium hydroxide containing three moles of ammonium chloride. This solution is heated on a steam bath for three hours keeping the pH greater than 8 with ammonium hydroxide. The reaction mixture then is cooled and the (3,5-diamino-6-chloropyrazinoyl) guanidine that precipitates is collected by filtration and dried to give product melting at 240.5–241.5° C. (dec.).

EXAMPLE 5

(3,5-diamino-6-bromopyrazinoyl)guanidine

By replacing the methyl 3,5-diamino-6-chloropyrazinoate employed in Example 1 by an equimolecular quantity of methyl 3,5-diamino-6-bromopyrazinoate and following substantially the same procedure described in Example 1 there is obtained (3,5-diamino-6-bromopyrazinoyl)guanidine, M.P. 232.5–235.5° C. (dec.).

The following table identifies other products that can be prepared by the process of this invention. The method employed for preparing these compounds comprises the reaction of the appropriate methyl 3-amino-5-$NR^1R^2$-6-chloropyrazinoate with an alkali metal salt of cyanamide such as the sodium or potassium salt but advantageously the sodium salt to form the corresponding pyrazinoylcyanamide which then is treated with a product of the structure $HNR^4R^5$ to form the pyrazinoyl guanidine end product. The reactions are carried out in the presence of a lower alkanol, dimethylformamide or dimethyl sulfoxide with heating at the reflux temperature of the solvent. The reactants as well as the end products are identified in the table; the variables $R^1$ and $R^2$ in the beginning ester product are not changed by the reaction conditions employed and remain unchanged in the end product produced and identified in the table, as also the reactant $HNR^4R^5$, the $R^4R^5$ of which remain unchanged by the reaction conditions employed.

| $R^1$ | $R^2$ | $R^4$ | $R^5$ | M.P., ° C. (d) of end product[1] |
|---|---|---|---|---|
| H | H | $CH_3$ | H | 252–254. |
| H | H | $CH_3$ | $CH_3$ | HCl monohydrate 277. |
| H | H | $C_2H_5$ | $C_2H_5$ | 265. |
| H | H | $CH_3$ | $-CH_2-\langle \rangle$ | HCl 274.5. |
| H | H | $-CH_2CH_2OH$ | H | HCl 228.5–229.5. |
| H | H | $-CH_2-\langle \rangle$ | H | 215–216. |
| H | H | $-CH_2-\langle \rangle$-Cl | H | 220–223. |
| H | H | $-CH_2-\langle \rangle$-F | H | 216–219.5; |
| H | H | $-CH_2-\langle \rangle$-$CH_3$ | H | 210–212; |
| H | H | $-CH_2-\langle \rangle$-$OCH_3$ | H | 175.5–179.5; |
| H | H | $-CH_2-\langle \rangle$-$CH_3$ (with $CH_3$) | H | 220–222. |
| H | H | $-CH(CH_3)-\langle \rangle$ | H | 152–160. |
| H | H | $-CH_2CH_2-\langle \rangle$ | H | 219–221.5. |
| H | H | $-CH_2-\langle N \rangle$ | H | 2 HCl 280.5–283.5. |
| H | $iC_3H_7$ | $CH_3$ | H | 300. |
| H | $iC_3H_7$ | $CH_3$ | $CH_3$ | 238.5–240. |
| H | $iC_3H_7$ | $-CH_2CH_2OH$ | H | HCl hemihydrate 185–186. |
| H | $iC_3H_7$ | $CH_2-\langle \rangle$ | H | 200.5–204.5 |

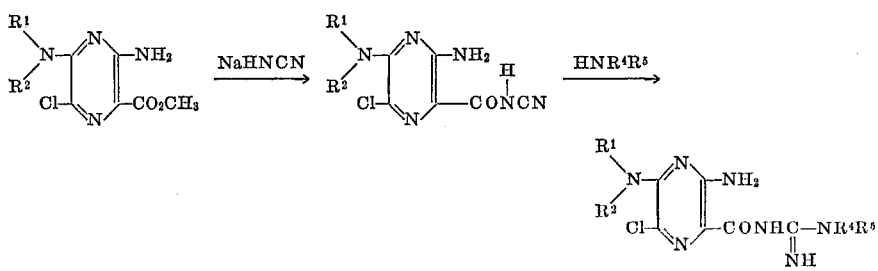

| R¹ | R² | R⁴ | R⁵ | M.P., °C. (d) of end product[1] |
|---|---|---|---|---|
| H | —CH₂CH₂=CH₂ | H | H | 213–214. |
| H | —CH₂CH=CH₂ | CH₃ | CH₃ | 213–215. |
| H | nC₄H₉ | CH₃ | CH₃ | 187.5. |
| H | CH₂—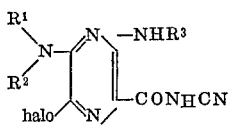 | H | H | 220–221.5. |
| CH₃ | CH₃ | H | H | 216–217. |
| CH₃ | C₂H₅ | H | H | 229–230. |
| CH₃ | nC₃H₇ | H | H | 214–215. |
| CH₃ | iC₃H₇ | H | H | 207–208. |
| CH₃ | iC₃H₇ | CH₃ | CH₃ | 209–211. |
| C₂H₅ | C₂H₅ | CH₃ | CH₃ | 212–214. |

[1] As free base unless otherwise noted.

What it claimed is:
1. The compound of structural formula $$\begin{array}{c} R^1 \\ \diagdown \\ R^2 \end{array} N - \underset{halo}{\underset{|}{\diagup}} \overset{N}{\underset{N}{\diagdown}} \overset{-NHR^3}{\diagup} - CONHCN$$

wherein halo is selected from the group consisting of chlorine and bromine, R¹ is selected from the group consisting of hydrogen, lower alkyl, lower alkenyl and lower (cycloalkylalkyl); R² is selected from the group consisting of hydrogen, lower alkyl, lower alkenyl and lower-(cycloalkylalkyl); R³ is selected from the group consisting of hydrogen and XCO wherein X is selected from the group consisting of hydrogen and lower alkyl.

2. The compound as claimed in claim 1, wherein R³ is hydrogen.

3. The compound as claimed in claim 1, wherein R³ is acetyl.

4. The compound as claimed in claim 1, wherein R¹ and R² are hydrogen.

5. The compound as claimed in claim 1, wherein R¹ is hydrogen.

6. The compound as claimed in claim 1, wherein R¹ and R² are lower alkyl.

7. 3 - amino - 5 - dimethylamino-6-chloropyrazinoyl-cyanamide.

8. 3,5-diamino-6-chloropyrazinoylcyanamide.

9. 3-acetylamino - 5 - amino - 6 - chloropyrazinoylcyanamide.

References Cited

FOREIGN PATENTS 63,501 1945 Denmark.
146,289 1920 Great Britain.

ALEX MAZEL, Primary Examiner

R. V. RUSH, Assistant Examiner

U.S. Cl. X.R.
260—999